United States Patent
Tanaka et al.

(10) Patent No.: US 12,400,482 B2
(45) Date of Patent: Aug. 26, 2025

(54) IMAGE PROCESSING DEVICE, IMAGE PROCESSING METHOD, AND NON-TRANSITORY COMPUTER READABLE MEDIUM

(71) Applicant: OMRON Corporation, Kyoto (JP)

(72) Inventors: Kiyoaki Tanaka, Kyoto (JP); Junichi Sugio, Kyoto (JP); Takahiro Takayama, Kyoto (JP)

(73) Assignee: OMRON CORPORATION, Kyoto (JP)

(*) Notice: Subject to any disclaimer, the term of this patent is extended or adjusted under 35 U.S.C. 154(b) by 368 days.

(21) Appl. No.: 18/006,623

(22) PCT Filed: Jul. 21, 2021

(86) PCT No.: PCT/JP2021/027375
§ 371 (c)(1),
(2) Date: Jan. 24, 2023

(87) PCT Pub. No.: WO2022/044637
PCT Pub. Date: Mar. 3, 2022

(65) Prior Publication Data
US 2023/0267767 A1    Aug. 24, 2023

(30) Foreign Application Priority Data
Aug. 24, 2020 (JP) ................. 2020-141222

(51) Int. Cl.
*G06V 40/20* (2022.01)
*G06V 40/16* (2022.01)

(52) U.S. Cl.
CPC ............ *G06V 40/20* (2022.01); *G06V 40/166* (2022.01); *G06V 40/172* (2022.01)

(58) Field of Classification Search
CPC .. G06Q 10/0639; G06V 20/52; G06V 40/166; G06V 40/172; G06V 40/20; G16Y 10/25; Y02P 90/30
See application file for complete search history.

(56) References Cited

U.S. PATENT DOCUMENTS

| | | | |
|---|---|---|---|
| 2019/0012621 A1* | 1/2019 | Kudo | ............... G06Q 10/06395 |
| 2023/0052278 A1* | 2/2023 | Fukuda | .................. H04N 7/181 |

FOREIGN PATENT DOCUMENTS

| | | | |
|---|---|---|---|
| JP | 2006202255 A | 8/2006 | |
| JP | 2015225486 A | 12/2015 | |

(Continued)

OTHER PUBLICATIONS

A machine translated English version of JP2016201074. (Year: 2016).*

(Continued)

*Primary Examiner* — Ruiping Li
(74) *Attorney, Agent, or Firm* — ROSSI, KIMMS & McDOWELL LLP

(57) ABSTRACT

An image processing apparatus includes an image obtainer that obtains a moving image including an operation area captured with an image sensor, an image generator that generates an image of a face region of a worker performing an operation in the operation area based on the moving image, a statistical information generator that generates statistical information for the operation performed by the worker based on the moving image, a data generator that generates data including the generated image of the face of the worker linked to the generated statistical information for the operation performed by the worker, and an output unit that outputs the generated data.

12 Claims, 11 Drawing Sheets

(56) References Cited

FOREIGN PATENT DOCUMENTS

| JP | 2016201074 A | * 12/2016 |
| JP | 2018073176 A | 5/2018 |
| JP | 2019101566 A | 6/2019 |
| JP | 2020017283 A | 1/2020 |

OTHER PUBLICATIONS

International Search Report issued in Intl. Appln. No. PCT/JP2021/027375 mailed Sep. 28, 2021. English translation provided.
Written Opinion issued in Intl. Appln. No. PCT/JP2021/027375 mailed Sep. 28, 2021. English translation provided.

* cited by examiner

IMAGE PROCESSING DEVICE, IMAGE PROCESSING METHOD, AND NON-TRANSITORY COMPUTER READABLE MEDIUM

TECHNICAL FIELD

The present invention relates to a technique for analyzing the behavior of a target using image sensors.

BACKGROUND

The market of factory automation provides practical techniques for facilitating, for example, an increase in productivity by identifying, for example, the number of workers performing operations and machines in operation and their operation positions using an image sensor installed on a cellular line and analyzing the details of operations in each operational process.

For example, Patent Literature 1 describes a technique for measuring the operation time by reading an identification (ID) tag attached to a workpiece operating on a line at an entrance and an exit of the line and identifying the operation start time and the operation end time for the workpiece. Patent Literature 2 describes a technique for displaying a time chart or a moving image associated with the details of operations performed by a tracked worker over a series of operations in an operational process.

CITATION LIST

Patent Literature

Patent Literature 1: Japanese Unexamined Patent Application Publication No. 2006-202255
Patent Literature 2: Japanese Unexamined Patent Application Publication No. 2018-073176

SUMMARY

Technical Problem

However, known techniques involve operations for specifying targets to be analyzed for the details of operations, such as attaching ID tags to workpieces or specifying a person whose operations are to be tracked by a user. For a technique using ID tags, the detection accuracy of a sensor or another device for reading the ID tags affects the accuracy of the measured time. The ID tags are also to be read for every process. For a user to specify a worker to be tracked in a video including a line, the user cannot distinguish individual workers. Thus, the user can identify the details of operations performed by each worker but without identifying individual workers.

In response to the above issue, one or more aspects of the present invention are directed to a technique for analyzing the details of an operation performed and also identifying an individual worker performing the operation based on an image obtained with an image sensor.

Solution to Problem

The device, method, and program according to one or more aspects of the present invention have the structure below.

An image processing apparatus according to a first aspect of the present invention includes an image obtainer that obtains a moving image including an operation area captured with an image sensor, an image generator that generates an image of a face region of a worker performing an operation in the operation area based on the moving image, a statistical information generator that generates statistical information for the operation performed by the worker based on the moving image, a data generator that generates data including the generated image of the face of the worker linked to the generated statistical information for the operation performed by the worker, and an output unit that outputs the generated data. This structure links an individual worker and the statistical information with each other based on the moving image from the image sensor, and allows analysis of operations identifying the individual worker.

The data generator may generate data including images of face regions of a plurality of workers generated by the image generator linked to statistical information for operations performed by the plurality of workers generated by the statistical information generator. The data generator may generate, for data output from the output unit, new data including at least two images of the images of the face regions of the plurality of workers integrated with the statistical information linked to the at least two images. The at least two images may be selected based on a user input. This allows the multiple images generated for the face region of a single worker to be integrated into a single image, and allows integration of the statistical information linked to the multiple images.

The data generator may generate, for data output from the output unit, new data including the image of the face region of the worker replaced by another image of the face region of the worker generated by the image generator. The data generator may generate data including an image of the face region of the worker selected based on a criterion including at least one of a size, an orientation, or a facial feature of the face region of the worker linked to the generated statistical information for the operation performed by the worker. The data generator may generate, based on matching between images of face regions of a plurality of workers obtained in advance and the generated image of the face region of the worker, data including an image of the face region of the worker selected from the images obtained in advance linked to the generated statistical information for the operation performed by the worker. This allows an image of the face region of a worker to be changed to an image more identifiable as the worker, and facilitates identification of the statistical information for the worker.

The statistical information generator may generate outline information and detailed information about the statistical information for the operation performed by the worker based on the moving image. The data generator may generate data including the image of the face region of the worker linked to the outline information about the generated statistical information for the operation performed by the worker and the detailed information about the generated statistical information for the operation performed by the worker. Linking the image of the face of the worker to various items of information useful for analyzing the operations of the worker allows more efficient analysis of operations.

The data generator may generate a moving image associated with the generated statistical information for the operation performed by the worker based on the obtained moving image. The data generator may generate data including the image of the face region of the worker linked to the generated statistical information for the operation performed by the worker and the generated moving image. The statistical information generator may generate, based on the moving image, statistical information for the operation performed by the worker for each of one or more operational processes included in the operation area. The data generator may generate, based on the obtained moving image, a moving image associated with the generated statistical information for the operation performed by the worker for each of the one or more operational processes. The data generator may generate data including the image of the face region of the worker linked to the generated statistical information for the operation performed by the worker for each of the one or more operational processes and the generated moving image for each of the one or more operational processes. This allows the moving image as a basis of the statistical information for the worker to be viewable, and allows more efficient analysis of operations.

The statistical information generator may generate evaluation information indicating an evaluation result obtained based on a predetermined criterion for the statistical information for the operation performed by the worker generated based on the moving image. The data generator may generate data including the image of the face region of the worker linked to the generated statistical information for the operation performed by the worker and the evaluation information. This allows information usable in analyzing the statistical information, such as statistical information for the worker indicating the operation time largely above or below target values, to appear as the evaluation results, and allows more efficient analysis of operations.

Other aspects of the present invention may be directed to an image processing method including at least part of the above processes, a program for causing a computer to implement the method, or a non-transitory computer-readable storage medium storing the program. The present invention may be implemented by combining the above structures and processes in any possible manner unless any technical contradiction arises.

Advantageous Effects

The technique according to the above aspects of the present invention allows the details of operations to be analyzed and also an individual worker to be identified based on images obtained with an image sensor.

DETAILED DESCRIPTION

Example Use

An example use of a technique according to one or more embodiments of the present invention will be described. To analyze the details of operations performed by each worker based on an image including the workers obtained with an image sensor located on a cellular or another line in a factory, the workers are to be individually identified. Identifying a worker includes positioning of the worker using the intensity of radio waves at a portable terminal carried by the worker and at wireless local area network (LAN) access points or positioning of the worker by reading an electronic tag attached to the worker. However, such positioning may have lower positioning accuracy with radio waves from the wireless LAN affected by various facilities and devices, or may involve preparation of many electronic tags to be attached to workers.

Figure 1:
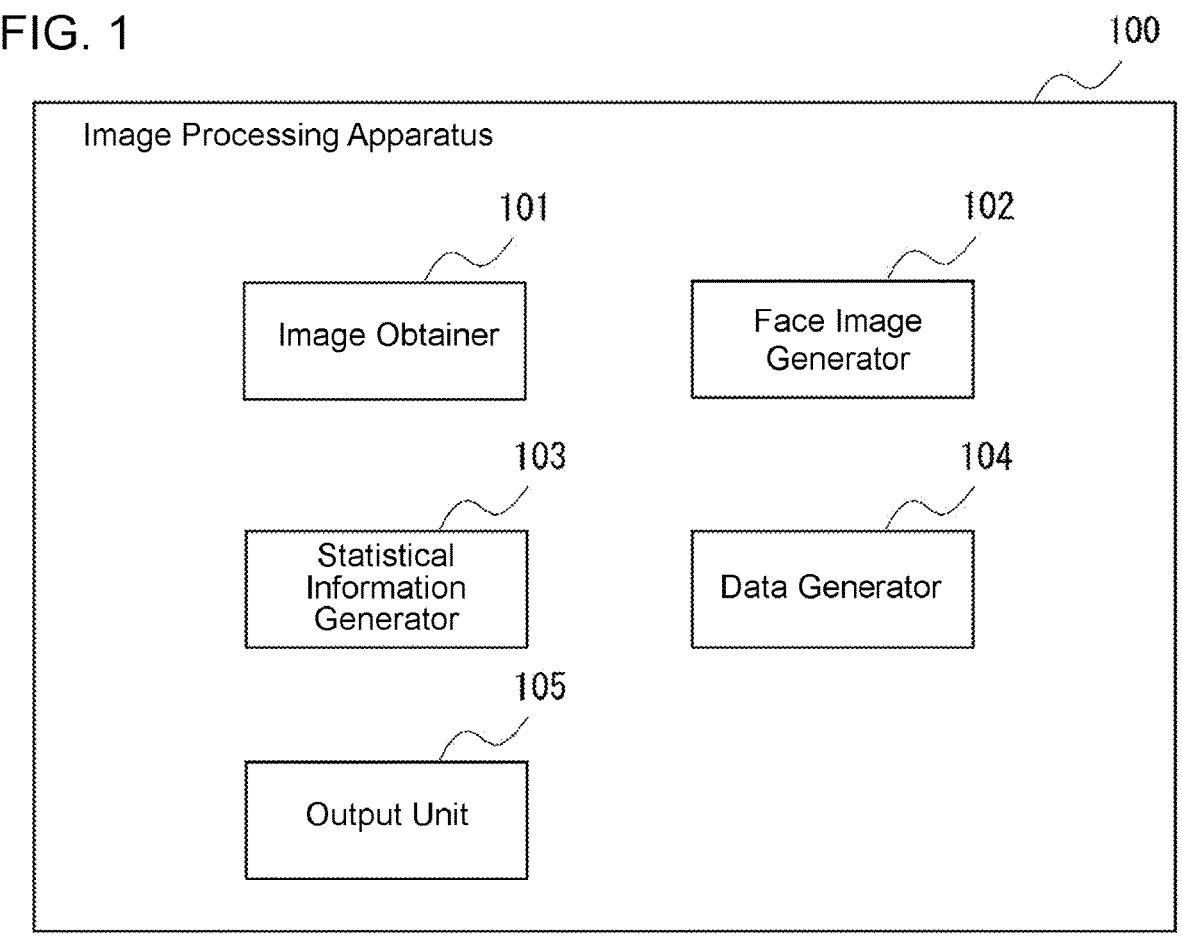
FIG. 1 is a block diagram of an image processing apparatus according to one or more embodiments of the present invention showing an example structure.

FIG. 1 is a block diagram of an image processing apparatus 100 according to an embodiment of the present invention showing an example structure. The image processing apparatus 100 includes an image obtainer 101, a face image generator 102, a statistical information generator 103, a data generator 104, and an output unit 105. The image obtainer 101 obtains an image captured with an image sensor such as a 360-degree camera located on a cellular line or another line. The face image generator 102 generates an image of a face region of each worker (face image) based on the captured image. The statistical information generator 103 generates statistical information for operations performed by each worker based on the captured image. The data generator 104 generates data including images of face regions of workers generated by the face image generator 102 linked to statistical information for operations performed by the workers generated by the statistical information generator 103. The output unit 105 outputs the data generated by the data generator 104.

The image processing apparatus 100 according to one or more embodiments of the present invention can accurately identify workers based on a captured image captured with the image sensor and provide information indicating the details of analysis of operations performed by each worker.

First Embodiment

A first embodiment of the present invention will now be described.

Figure 2:
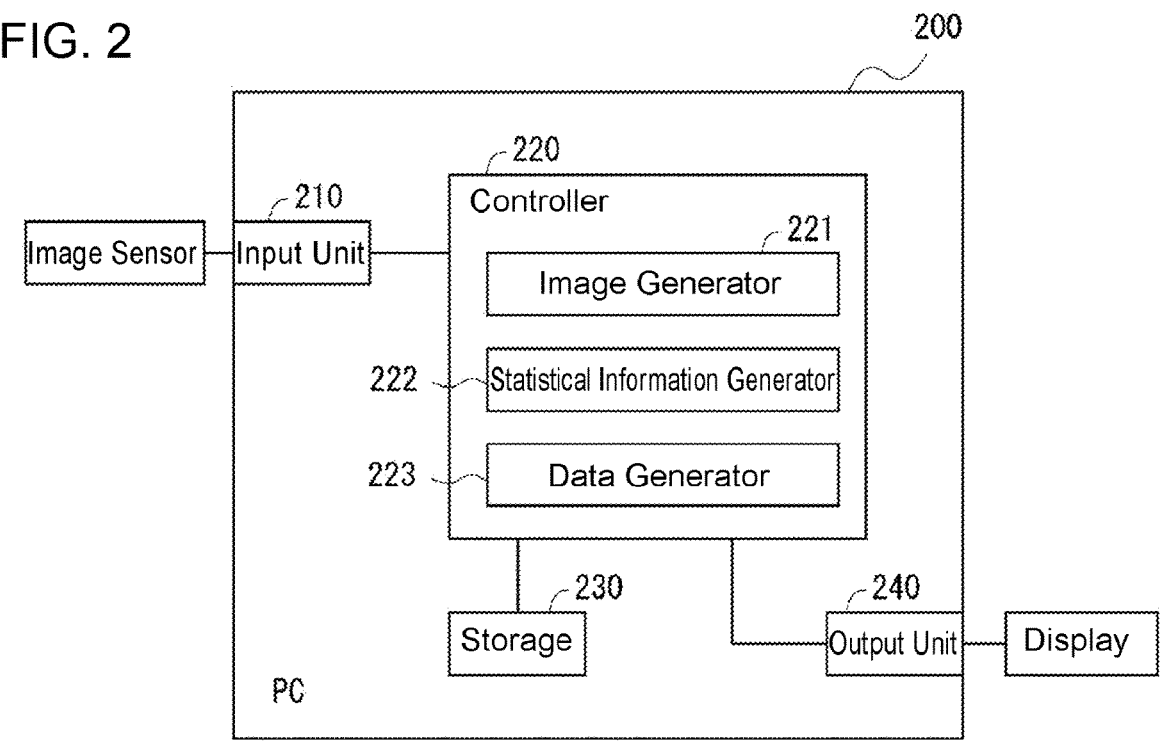
FIG. 2 is a block diagram of a personal computer (PC) (image processing apparatus) according to an embodiment showing an example structure.

FIG. 2 is a schematic block diagram of an image processing system according to the first embodiment showing an example structure. The image processing system according to the first embodiment includes an image sensor, a personal computer (PC) 200 (image processing apparatus), and a display. The image sensor and the PC 200 are connected to each other with a wire or wirelessly. The PC 200 and the display are connected to each other with a wire or wirelessly.

In the first embodiment, the image sensor captures a cellular line placed at a factory, a distribution warehouse, or another facility. An area of the cellular line in a captured image captured with the image sensor is a detection area for human detection targeting workers. The image sensor captures an image of the cellular line and outputs the captured image to the PC 200. Although the image sensor may capture an image in any direction, the image sensor in the first embodiment is installed above the cellular line, or specifically, on the ceiling of the floor on which the cellular line is placed to provide a wide overall view of the cellular line. The PC 200 performs human detection based on the captured image captured with the image sensor and outputs detection results to the display. Examples of the display include a display device and an information processing terminal (e.g., a smartphone).

In the first embodiment, the PC 200 is a device separate from the image sensor and the display. In some embodiments, the PC 200 may be integral with the image sensor or the display. The PC 200 may be at any location. The PC 200 may be in, for example, the same room as the image sensor. In some embodiments, the PC 200 may be a cloud computer.

The PC 200 includes an input unit 210, a controller 220, a storage 230, and an output unit 240. The controller 220 includes an image generator 221, a statistical information generator 222, and a data generator 223. The input unit 210, the image generator 221, the statistical information generator 222, the data generator 223, and the output unit 240 respectively correspond the image obtainer, the image generator, the statistical information generator, the data generator, and the output unit in one or more embodiments of the present invention.

The input unit 210 obtains, from the image sensor, moving image data including the cellular line captured with the image sensor, and outputs the moving image data to the controller 220. The moving image data obtained by the input unit 210 from the image sensor is stored into the storage 230 by the controller 220. The moving image data obtained by the input unit 210 includes the cellular line captured over a predetermined period (an hour, a day, or another period set as appropriate).

The controller 220 includes, for example, a central processing unit (CPU), a random-access memory (RAM), and a read-only memory (ROM). The controller 220 controls each unit in the PC 200 and performs various information processes.

The image generator 221 detects a face region of a worker in the captured image based on the moving image data obtained by the input unit 210. A face region of a worker in moving image data obtained with the image sensor can be detected with known techniques by detecting the facial features of a human body. This process is not described in detail herein. The image generator 221 also determines whether a worker with a detected face region is a worker to be analyzed for the details of operations. In the present embodiment, the storage 230 prestores worker identifications (IDs) for identifying workers and information for identifying a worker with a detected face region as a worker to be analyzed based on, for example, a detected position in the moving image and the degree of similarity in image features. The image generator 221 identifies, based on the information stored in the storage 230, the worker to be analyzed using the detected face region, and stores the worker ID of the identified worker and detected information about the position of the worker in the moving image into the storage 230. When no worker is identified using the detected face region, the image generator 221 determines that the worker corresponding to the detected face region is a new worker, generates a new worker ID, and stores the generated worker ID and the detected position information in the moving image into the storage 230.

The image generator 221 generates an image of the detected face region. The image of the face region of the worker generated by the image generator 221 may be stored into the storage 230, or may be transmitted to each unit in the PC 200 that processes the image.

The statistical information generator 222 generates statistical information for the details of operations performed by each of the detected workers based on the moving image data obtained by the input unit 210 and the above information generated by the image generator 221, which are stored in the storage 230. An example of the statistical information includes a Gantt chart showing the operation time for each process on a cellular line. The statistical information may include information about a target operation time as a reference operation time for each process to be compared with the operation time of each worker. The operation time of each worker for each process can be calculated based on a captured image captured with the image sensor, and a Gantt chart can be generated based on the calculation results with known techniques. These processes are not described in detail herein.

The data generator 223 generates data including the image of the face region of each worker identified by the image generator 221 linked to the statistical information for the details of operations performed by each worker generated by the statistical information generator 222. In the present embodiment, the data generator 223 generates data such as an image displayable on the display connected to the output unit 240. However, the data generator 223 may generate other data processable by other information processing devices.

In addition to the above statistical information, the storage 230 stores a program executable by the controller 220 and various sets of data used by the controller 220. For example, the storage 230 is an auxiliary storage device such as a hard disk drive or a solid state drive. The output unit 240 outputs an image generated by the data generator 223 to the display. The image generated by the data generator 223 may be stored into the storage 230 for output through the output unit 240 at any time.

Figure 3:
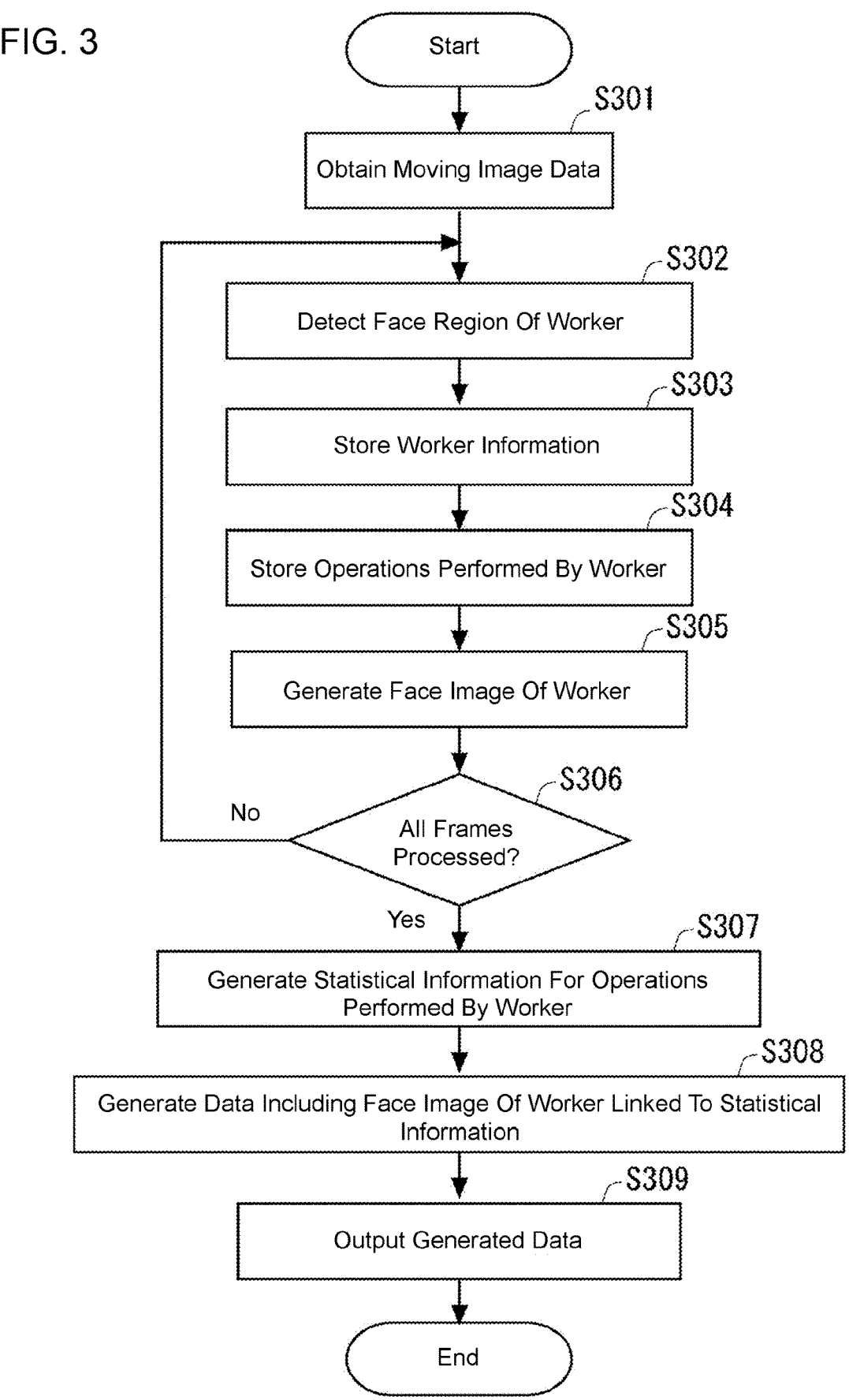
FIG. 3 is a flowchart of an example process performed by the PC according to the embodiment.

FIG. 3 is a flowchart of an example process performed by the PC 200. The PC 200 performs the procedure in FIG. 3 after the input unit 210 obtains moving image data from the image sensor and stores the moving image data into the storage 230.

In step S301, the controller 220 first obtains the moving image data captured with the image sensor and stored in the storage 230.

The image generator 221 then repeats the processing in steps S302 to S305 for each frame of the moving image data obtained from the storage 230. In step S302, the image generator 221 detects a face region of a worker from a frame of the moving image data obtained from the storage 230. In step S303, the image generator 221 obtains, from the storage 230, information for determining whether the worker is a worker to be analyzed based on the detected face region and identifies the worker corresponding to the face region detected in step S302 as a worker to be analyzed. When a worker to be analyzed is successfully identified based on the detected face region, the image generator 221 stores the worker ID of the worker linked to information about the position of the worker in the frame into the storage 230. When a worker to be analyzed is not identified based on the detected face region, the image generator 221 generates a new worker ID to the worker corresponding to the detected face region, and stores the generated worker ID linked to information about the position of the worker in the frame into the storage 230.

In step S304, the image generator 221 further distinguishes operational processes performed by the worker based on the information about the cellular line captured with the image sensor and stored in the storage 230 and the information about the position of the worker in the frame, and stores the distinguished operational process linked to the above information about the position of the worker into the storage 230.

In step S305, the image generator 221 generates an image of the face region of the worker detected in step S302 based on the image in the frame, and stores the generated image of the face region linked to the worker ID into the storage 230. In the present embodiment, the image generator 221 obtains an image of a face region of a worker for each frame obtained by the input unit 210. However, the image generator 221 repeating the processing in steps S302 to S305 may obtain an image of a face region of a worker intermittently at any time, or may simply obtain an image of a face region of each worker once.

In step S306, the image generator 221 determines whether all frames of the moving image data obtained in step S301 have undergone the processing in steps S302 to S305. For a frame yet to undergo the processing in steps S302 to S305 (No in S306), the image generator 221 returns to step S302 and performs the processing in steps S302 to S305 on the frame. When all frames of the moving image data have undergone the processing in steps S302 to S305 (Yes in S306), the image generator 221 advances the processing to step S307.

In step S307, the statistical information generator 222 generates statistical information, such as the operation time for each operational process on the cellular line and the average operation time, based on the data for each worker stored in the storage 230 through the processing in steps S302 to S305 described above. In the present embodiment, the statistical information generated by the statistical information generator 222 includes Gantt charts indicating the operation time for each process. The statistical information generator 222 links generated Gantt charts for each worker to the corresponding worker IDs and stores the charts with the IDs into the storage 230.

In step S308, the data generator 223 obtains, from the storage 230, the image of the face region of each worker generated by the image generator 221 and the statistical information generated by the statistical information generator 222, and generates data including the image of the face region of each worker linked to the statistical information based on the worker ID.

In step S309, the output unit 240 outputs the data generated by the data generator 223 in step S308 to the display. In step S309, instead of or in addition to outputting the data generated by the data generator 223, the output unit 240 may store the data into the storage 230.

Figure 4:
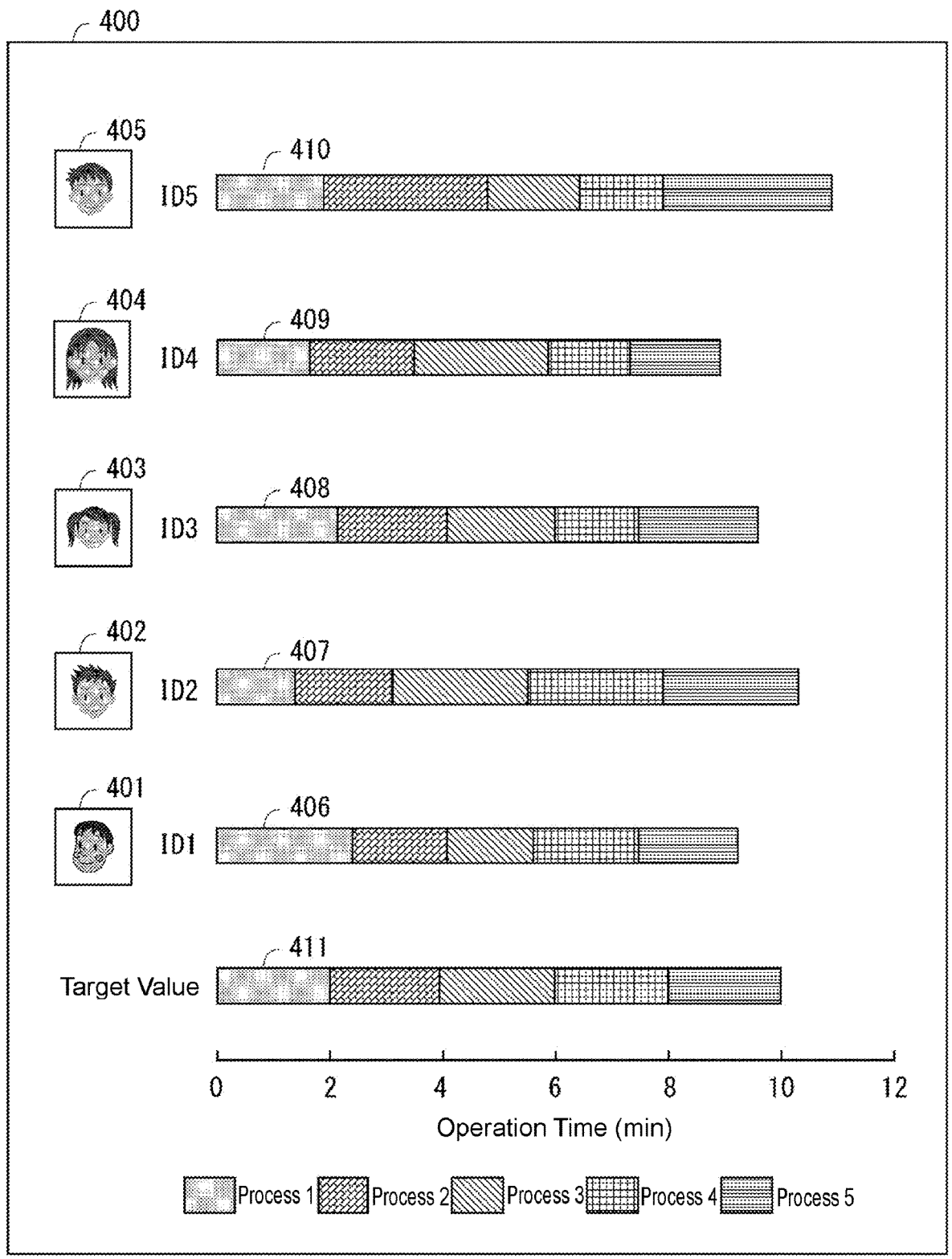
FIG. 4 is a schematic diagram of an example display screen in the embodiment.

FIG. 4 is a schematic diagram of an example display screen 400 on the display with data generated by the data generator 223 through the procedure in FIG. 3. The display screen 400 shows face images 401 to 405 corresponding to the respective workers obtained by the image generator 221, identification numbers (ID1 to ID5 in the figure) for the respective workers, and Gantt charts indicating the details of operations performed by the respective workers generated by the statistical information generator 222.

The display screen 400 shows the face images, the identification numbers, and the Gantt charts corresponding to the respective workers in a manner associated with one another for a user viewing the display screen 400. In the present embodiment, the cellular line captured with the image sensor includes separate operational processes for a worker, or specifically, processes 1 to 5, which are displayed in the Gantt charts 406 to 410 generated by the statistical information generator 222 indicating the operation time for each process. The display screen 400 also shows a Gantt chart 411 for target values generated by the statistical information generator 222 based on a target operation time preset for each process.

The structure according to the present embodiment can thus accurately identify a worker and can link the worker to statistical information for the details of operations performed by the worker by generating data including a face image for each worker performing operations on a cellular line linked to statistical information for the operations based on moving image data from the image sensor capturing the cellular line, without causing the cost of, for example, attaching tags or other devices to workers or without any possibility of, for example, lower accuracy in identifying workers when a communication system such as a wireless LAN is used to identify workers.

Others

The above embodiment describes exemplary structures according to one or more aspects of the present invention. The present invention is not limited to the specific embodiment described above, but may be modified variously within the scope of the technical ideas of the invention. For example, the components and the processes in the above embodiment may be combined with each other. Modifications of the above embodiment will be described below. In the modifications described below, like reference numerals denote like structural elements in the above embodiment. Such elements will not be described.

First Modification

In a first modification, a worker corresponding to a detected face image is to be identified as a worker prestored in the storage 230 with the processing performed by the PC 200 described above. However, the worker identified based on image processing may be misidentified, causing the detected face region to be linked to a new worker ID. In this case, the above processing causes statistical information for a single worker to be divided into multiple sets of statistical information.

Figure 5:
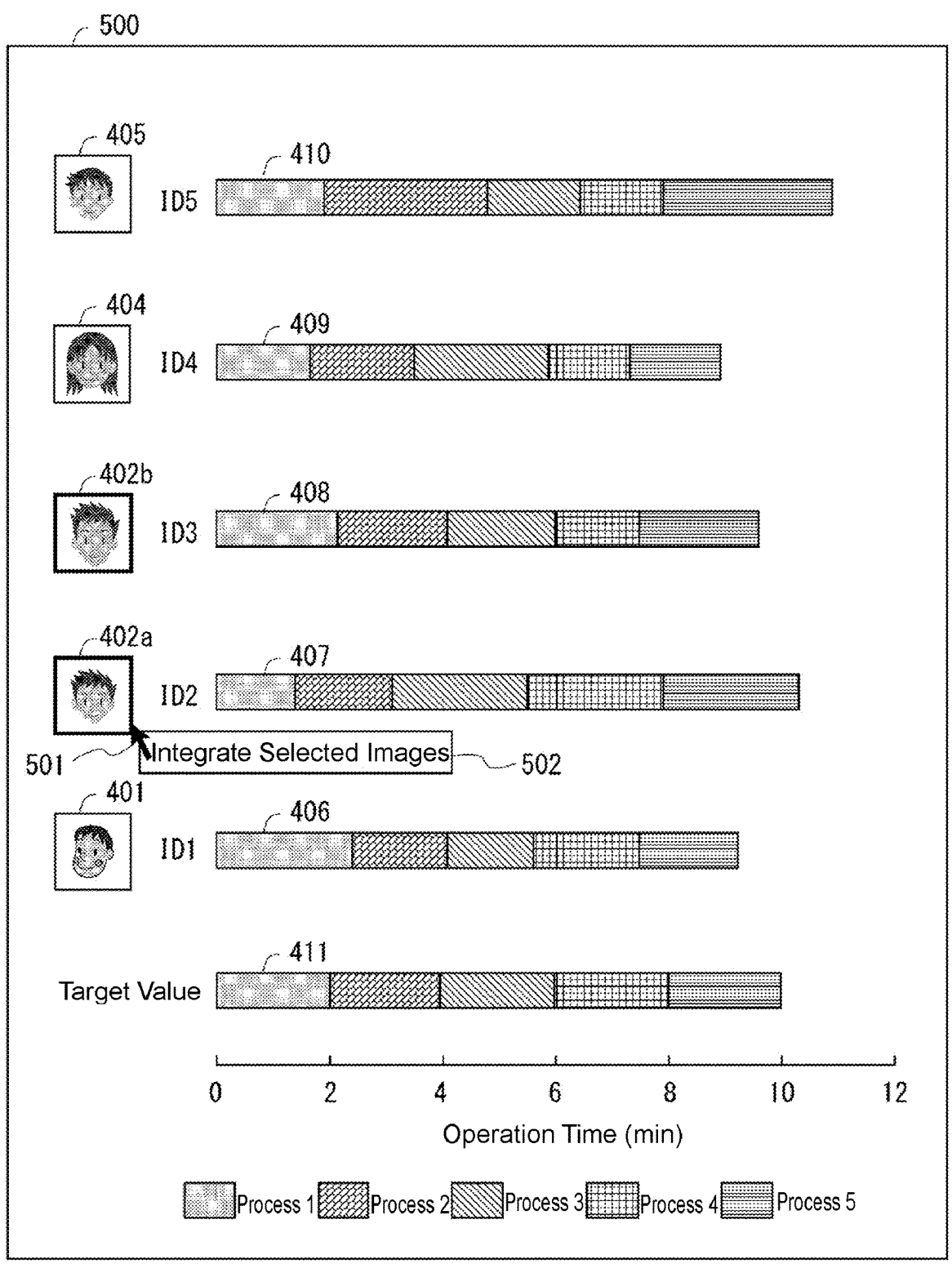
FIG. 5 is a schematic diagram of an example display screen in a first modification.

In the example shown in FIG. 5, an image of the face region of the worker with a worker ID2 is misidentified as a new worker and receives another worker ID3. Thus, information for a single worker is calculated separately for the different worker ID2 and ID3, and different Gantt charts linked to the respective worker IDs are generated. As in the example of a display screen 500, with the display screen 500 including a single worker linked to multiple Gantt charts as described above, a user can operate an input device (not shown) connected to the display and integrate sets of the face images and the Gantt charts to increase the efficiency of analyzing statistical information.

More specifically, the user operates a cursor 501 displayed on the display screen 500 and selects two different face images 402a and 402b indicating the same worker. With the two face images 402a and 402b being selected, the user operates the input device and causes a menu 502 for integrating these two face images 402a and 402b to be displayed. The user further operates the input device and selects the menu 502 to perform integration of the two face images 402a and 402b selected by the PC 200 and the Gantt charts linked to the face images. Thus, the two sets of the face images 402a and 402b and the Gantt charts 407 and 408 selected on the display screen 500 are integrated into a single set of a face image and a new Gantt chart.

The face image to be displayed on the display screen 500 after the integration may be one of the face images 402a and 402b selected by a user input or through the processing performed by the PC 200, or another face image indicating the same worker stored in the storage 230. The new Gantt chart may be generated by the statistical information generator 222 calculating the average of each process based on the original Gantt charts 407 and 408. The user may operate the input device and, instead of selecting the two face images 402a and 402b, select the identification numbers (ID2 and ID3 in the figure) or the Gantt charts 407 and 408 displayed with a link to the face images 402a and 402b. Three or more sets of face images and Gantt charts may be combined.

Second Modification

Figure 6:
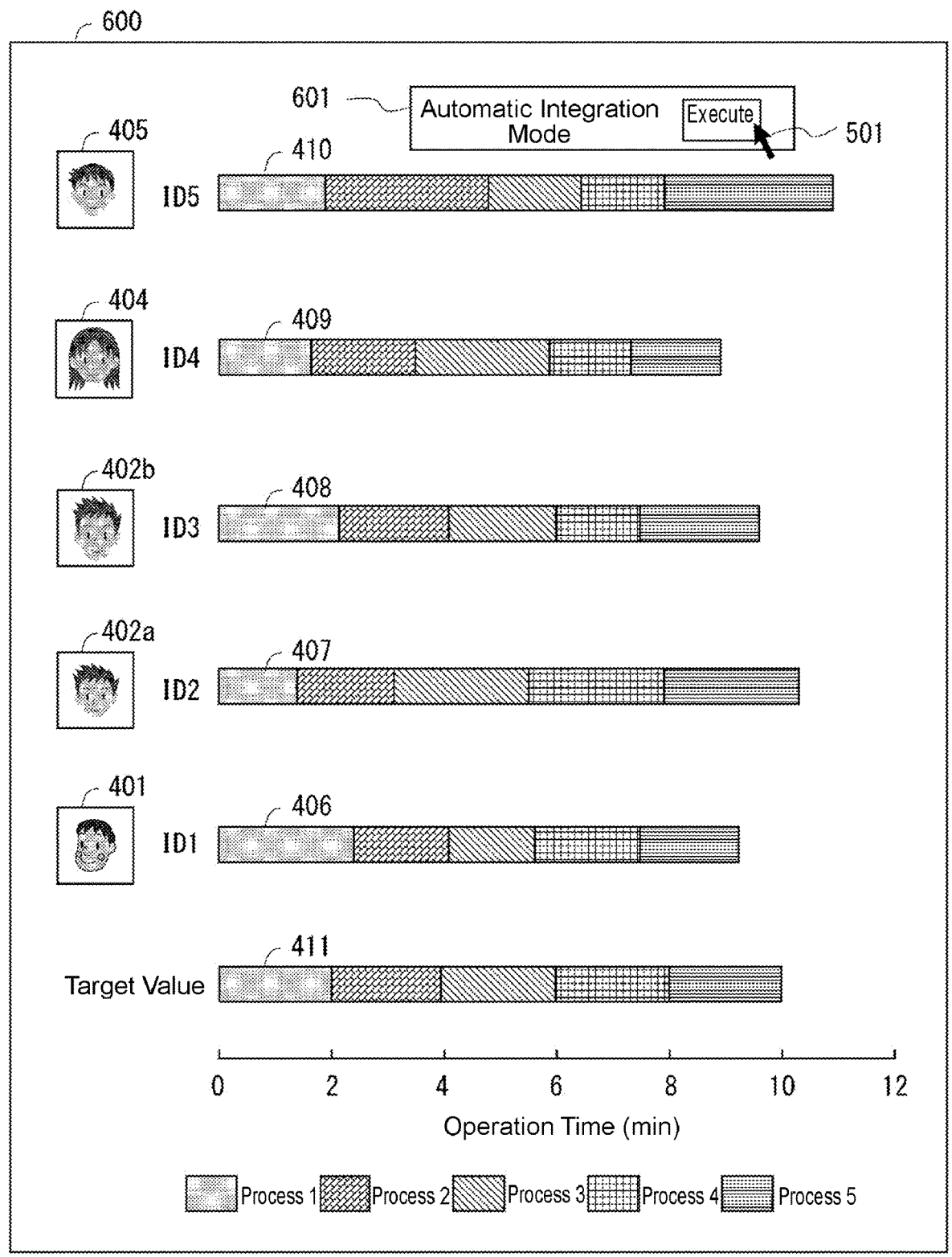
FIG. 6 is a schematic diagram of an example display screen in a second modification.

In a second modification, the processing performed by the PC 200 described above generates data for a display screen 600 to appear on the display as illustrated in FIG. 6. In the present modification, as in the example of the display screen 600, a menu 601 for allowing the PC 200 to automatically perform the integration of multiple sets of face images and Gantt charts as in the first modification appears on the display screen 600. In the second modification as well, the background to a single worker linked to multiple sets of statistical information is the same as in the first modification. The second modification will be described focusing on the differences from the first modification.

With the display screen 600 on the display, the user operates the input device and presses an execution button 602 in the menu 601 with the cursor 501. This causes the PC 200 to perform the processing of integrating multiple sets of the face images 402a and 402b and the Gantt charts 407 and 408 as in the first modification. The PC 200 can identify the sets of the face images 402a and 402b and the Gantt charts 407 and 408 to be integrated based on the similarity between the face images.

Third Modification

Figure 7:
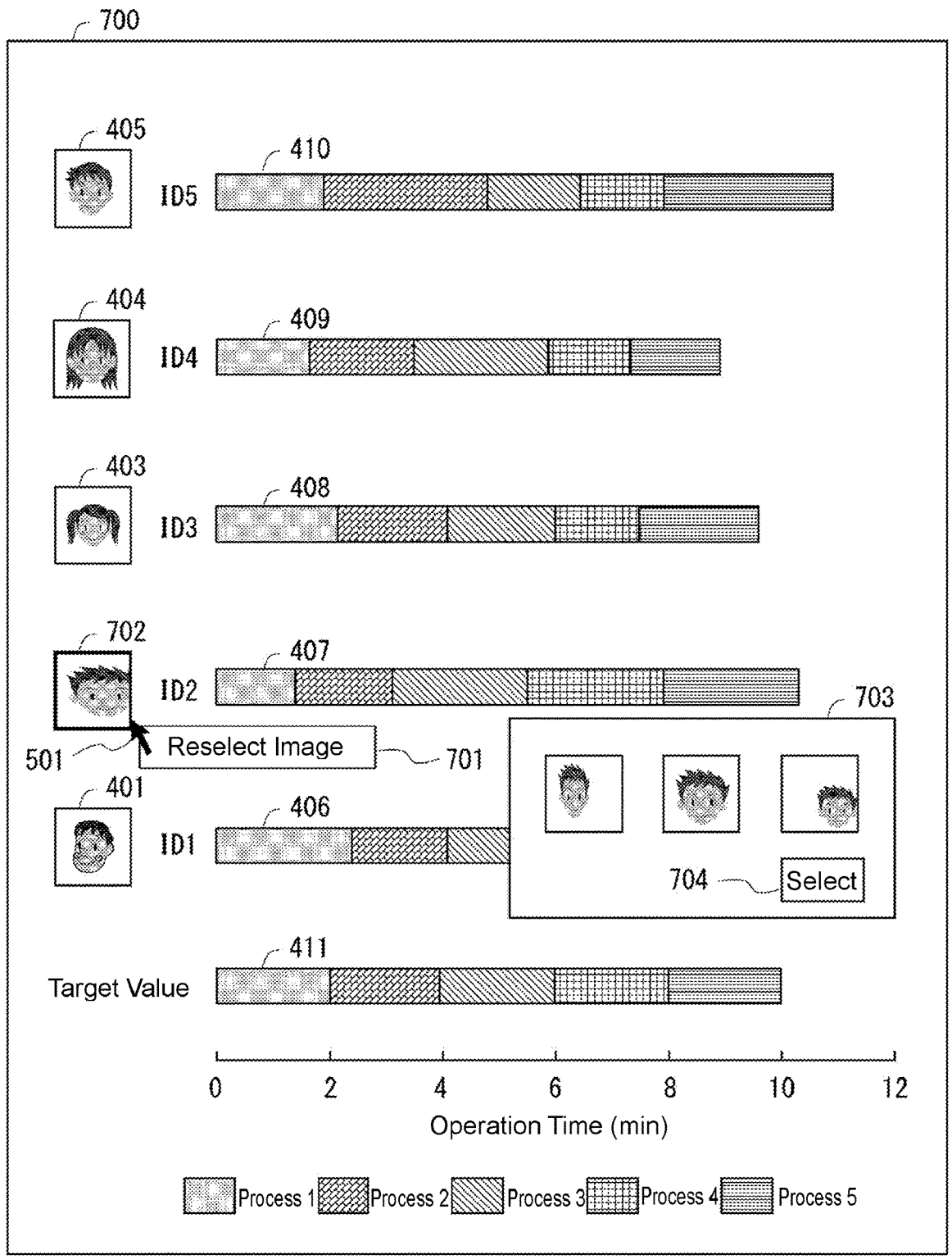
FIG. 7 is a schematic diagram of an example display screen in a third modification.

In a third modification, the processing performed by the PC 200 described above generates data for a display screen 700 to appear on the display as illustrated in FIG. 7. In the present modification, as in the example of the display screen 700, the face of a worker displayed in a face image 702 is partially missing. The user operates the input device and selects a face image more appropriate as the face image 702 to facilitate distinguishing statistical information for each worker.

More specifically, the user operates the cursor 501 on the display screen 700 and selects the face image 702 to be changed. With the face image 702 being selected, the user operates the input device and causes the menu 701 for reselecting a face image 702 to be displayed. In response to the user further operating the input device and selecting the menu 701, other face images of a worker corresponding to the face image 702 among face images generated by the image generator 221 and stored in the storage 230 appear on a selection screen 703. In response to the user selecting an appropriate face image from the multiple face images displayed on the selection screen 703 and pressing a select button 704, the face image 702 is changed to the selected face image. The resultant face image is linked to the worker ID and the statistical information and is stored into the storage 230 for subsequent face image displays.

Fourth Modification

Figure 8:
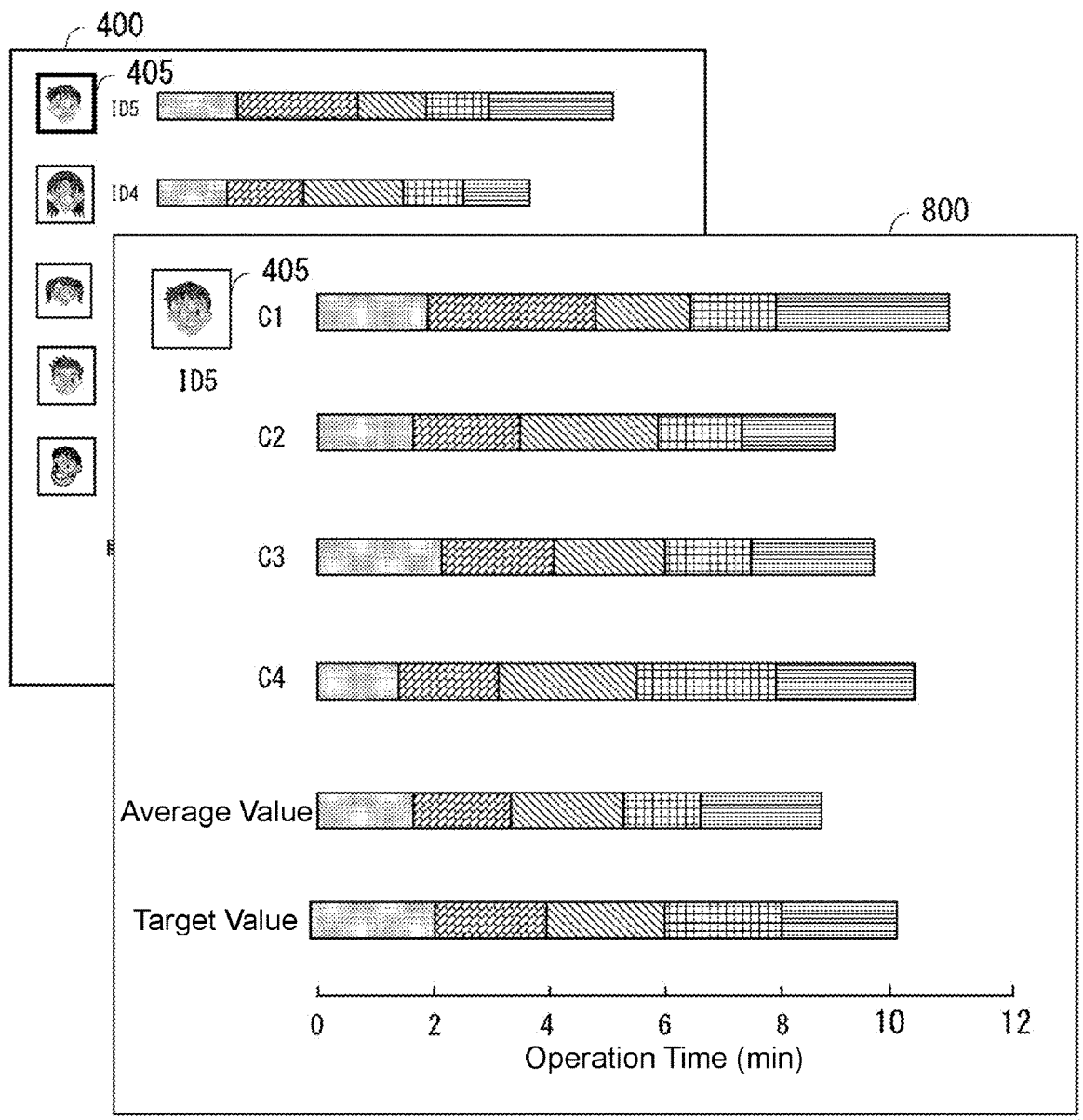
FIG. 8 is a schematic diagram of an example display screen in a fourth modification.

In a fourth modification, the processing performed by the PC 200 described above generates data for a display screen 800 to appear on the display as illustrated in FIG. 8. In the present modification, as in the example of the display screen 800, in response to the user operating the input device and selecting one of face images (the face image 405 in the example in the figure) on the display screen 400 displayed in the first modification, more detailed information about the statistical information for operations performed by a worker corresponding to the selected face image 405 appears on the display screen 800. Examples of information displayed on the display screen 800 include Gantt charts indicating the operation time per cycle on the cellular line (Gantt charts corresponding to C1 to C4 in the figure), a Gantt chart indicating the average operation time, and a Gantt chart indicating a target operation time. The details of the statistical information on the display screen 800 are not limited to the information illustrated in the figure and may be set as appropriate. This allows the user to switch the screen to view the outline information about the statistical information for operations associated with multiple workers (display screen 400) and the detailed information about the statistical information for operations associated with an individual worker (display screen 800) and to analyze the statistical information more efficiently.

Fifth Modification

Figure 9:
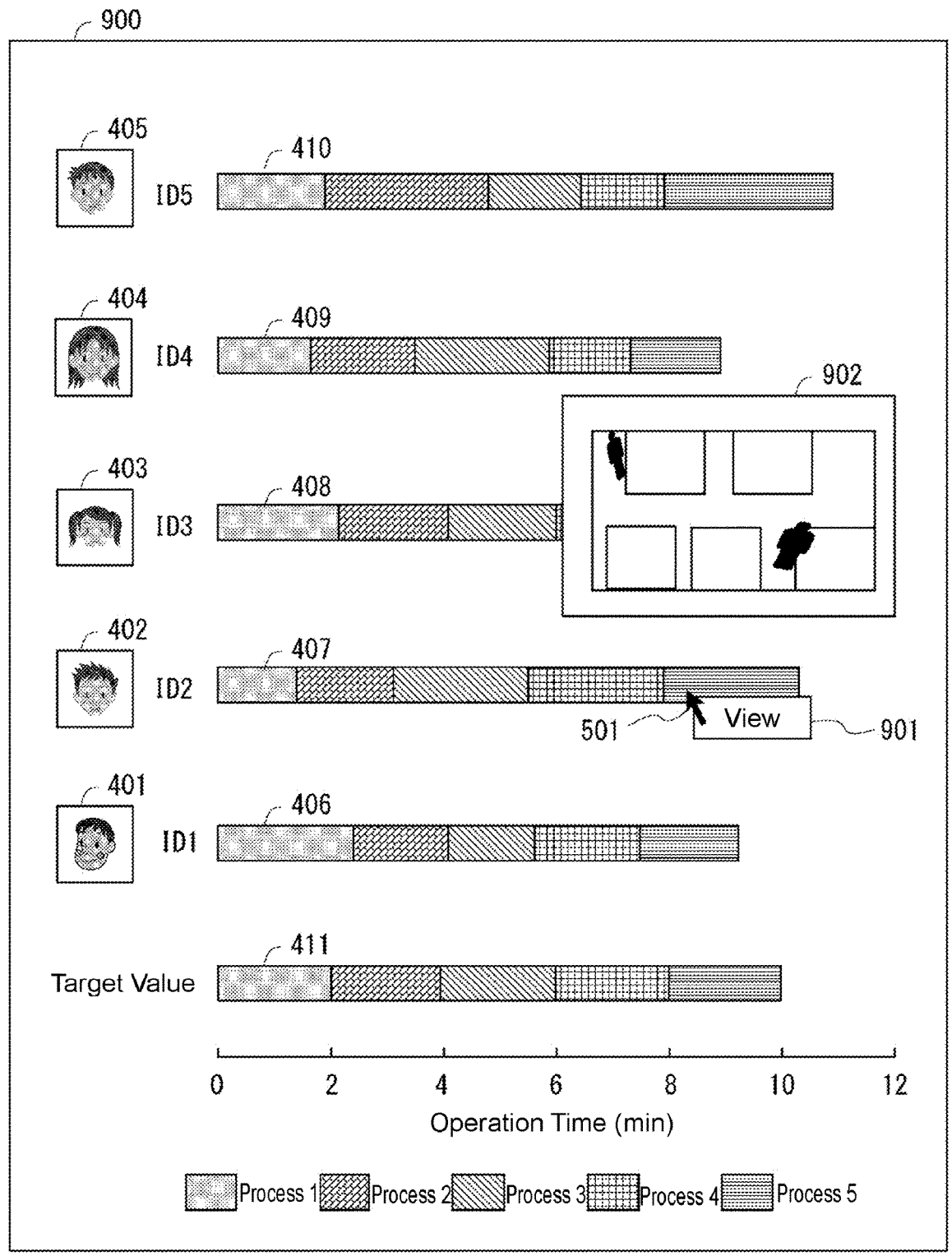
FIG. 9 is a schematic diagram of an example display screen in a fifth modification.

In a fifth modification, the processing performed by the PC 200 described above generates data for a display screen 900 to appear on the display as illustrated in FIG. 9. In the present modification, as in the example of the display screen 900, the user can view a moving image of each operation performed by a worker.

More specifically, the user operates the cursor 501 on the display screen 900 and selects, in a Gantt chart for a worker, a process to view its moving image (in the example in the figure, process 5 of a worker with the face image 402 is selected), and a view menu 901 for viewing a moving image appears. In response to the user operating the input device and selecting the view menu 901, a moving image screen 902 for the selected process appears, and the moving image is played. Thus, the user can obtain information about the details of operations unobtainable from statistical information alone, and can perform more accurate analysis. For a moving image to be displayed on the moving image screen 902, the controller 220 generates a moving image for each process by a worker based on the moving image data stored in the storage 230, and may store the moving image into the storage 230. Although a moving image is displayed for each process in the example described above, a moving image including a series of processes may be displayed to cover multiple processes or an entire set of processes.

Sixth Modification

Figure 10:
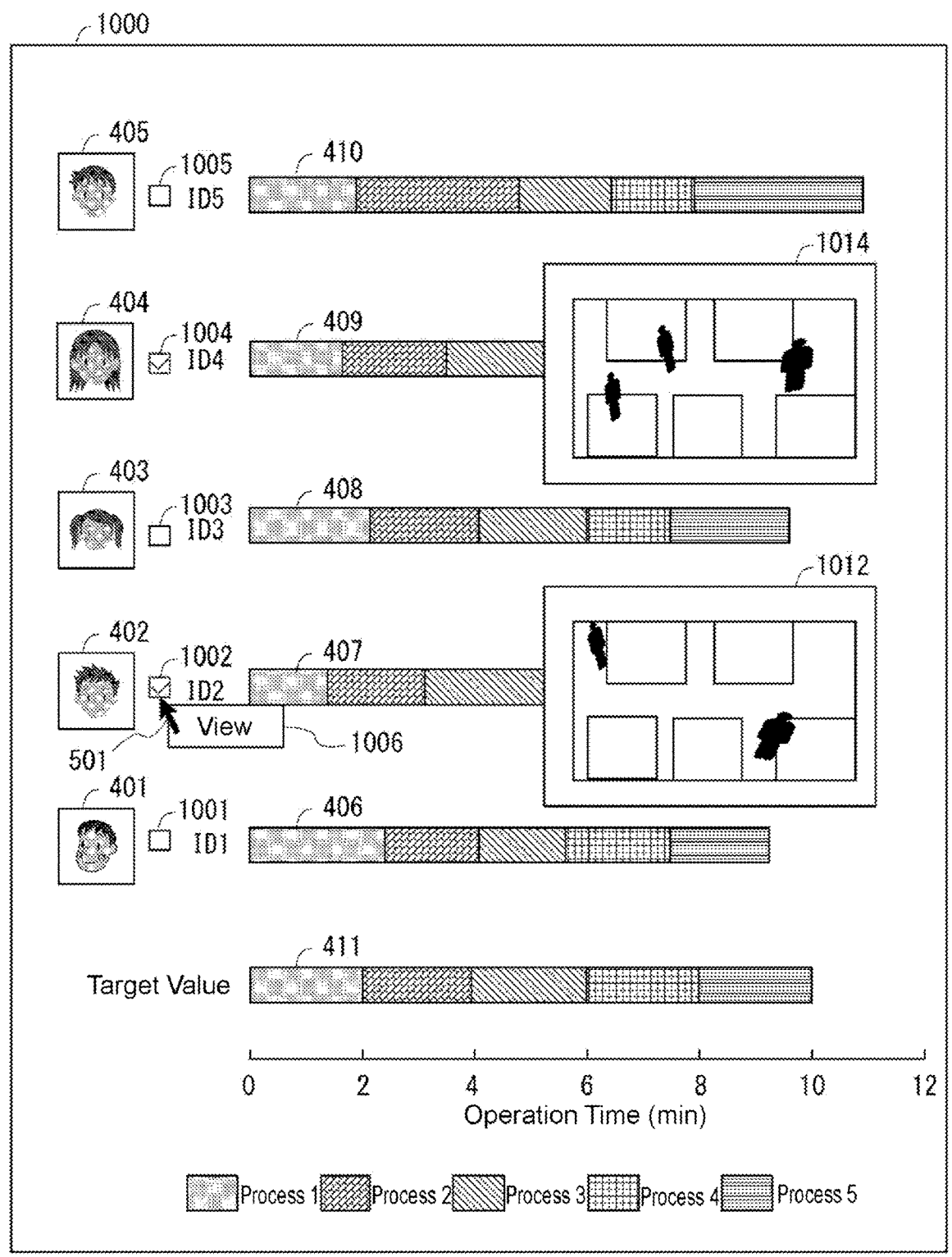
FIG. 10 is a schematic diagram of an example display screen in a sixth modification.

In a sixth modification, the processing performed by the PC 200 described above generates data for a display screen 1000 to appear on the display as illustrated in FIG. 10. In the present modification, as in the example of the display screen 1000, the user can simultaneously view moving images of multiple workers (or processes).

More specifically, the user operates the cursor 501 on the display screen 1000 and selects, in the Gantt charts for workers, workers to view their moving images by checking checkboxes 1001 to 1005 appearing adjacent to the face images 401 to 405 of the workers (in the example in the figure, the worker with the face image 402 and the worker with the face image 404 are selected). In response to the user operating the input device and selecting a view menu 1006 for viewing moving images, moving image screens for each worker with a checked one of the checkboxes 1001 to 1005 (in the figure, a moving image screen 1012 corresponding to the worker 402 and a moving image screen 1014 corresponding to the worker 404) appear, and the moving images are played. Thus, information unrecognizable from the statistical information may be obtained by comparing the behavior of a new worker with that of an expert worker during a process.

Seventh Modification

Figure 11:
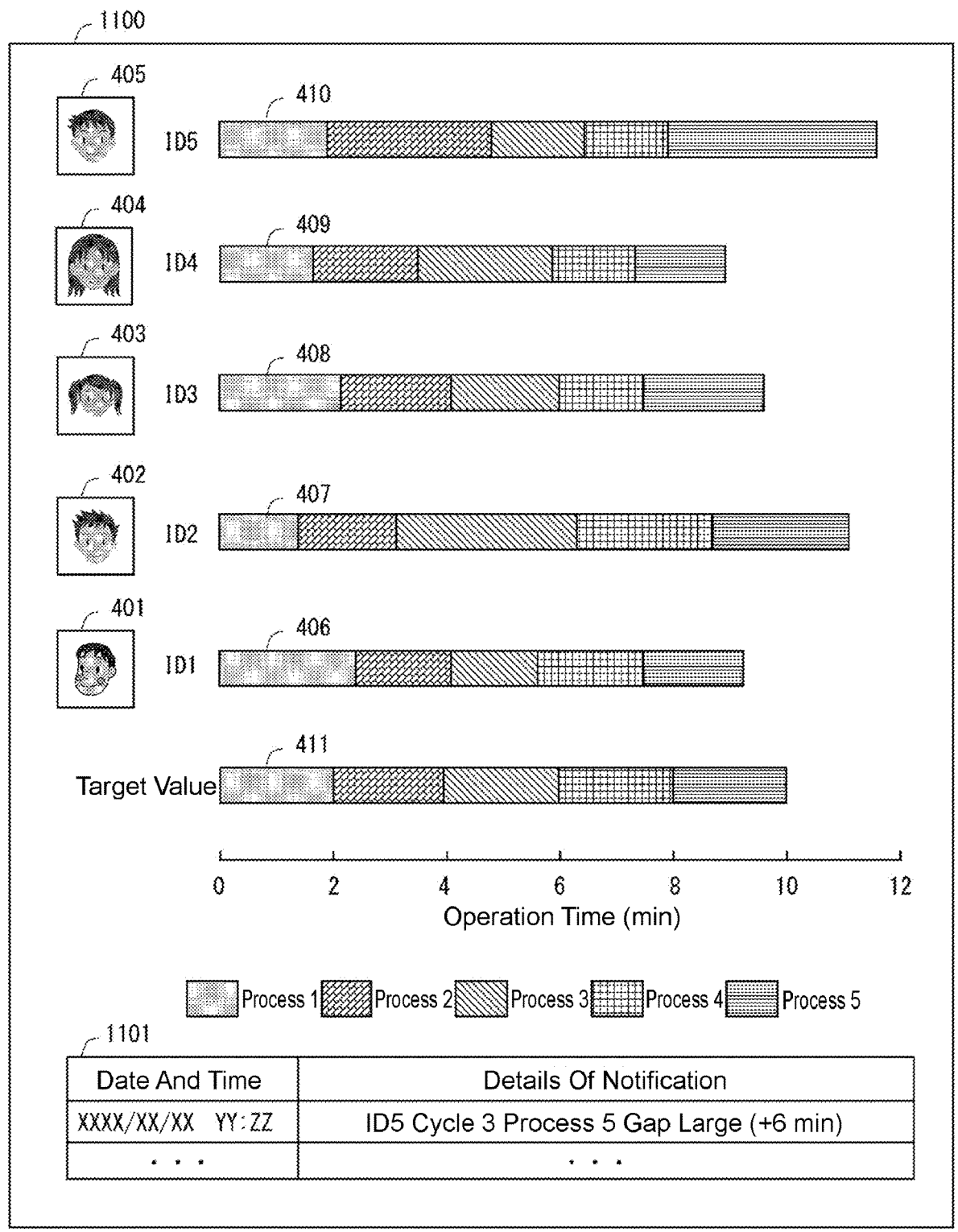
FIG. 11 is a schematic diagram of an example display screen in a seventh modification.

In a seventh modification, the processing performed by the PC 200 described above generates data for a display screen 1100 to appear on the display as illustrated in FIG. 11. In the present modification, as in the example of the display screen 1100, a notification area 1101 appears on the display screen 1100 to notify the user of a piece of statistical information for workers different from the target operation time by a threshold or greater. For example, as illustrated in the figure, the notification area 1101 stores the date of notification in its date column and the details of a notification in its details of notification column. In the example in the figure, the details of the notification, ID5 cycle 3 process 5 gap large (+6 minutes), indicates that the operation time of the worker with ID5 (the worker with the face image 405) for the process 5 during the third cycle is 6 minutes longer than the target operation time. The information displayed in the notification area 1101 may be generated by the statistical information generator 222. For example, the statistical information generator 222 compares statistical information for operations performed by each worker with the target operation time and, with the difference being a threshold or greater, generates information to be displayed in the notification area 1101. Thus, the user uses the received information to efficiently perform more accurate analysis of the statistical information. The information to be displayed on the notification area 1101 is not limited to the example in the figure, and various items of information may be displayed. A criterion for determining whether to display information in the notification area 1101 may be determined as appropriate depending on the details of the information to be displayed.

Eighth Modification

Figure 12:
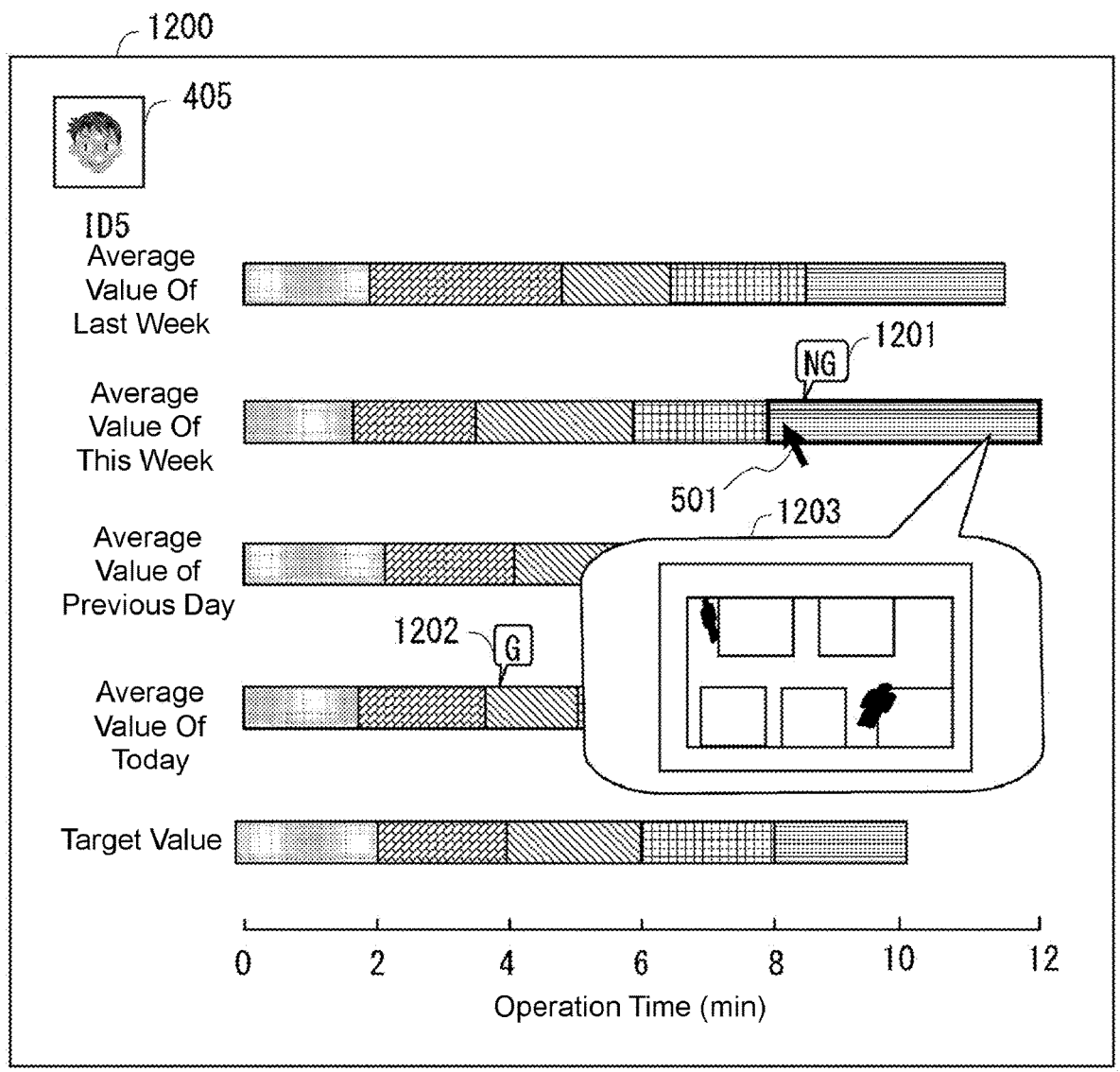
FIG. 12 is a schematic diagram of an example display screen in an eighth modification.

In an eighth modification, the processing performed by the PC 200 described above generates data for a display screen 1200 to appear on the display as illustrated in FIG. 12. The display screen 1200 shows periods (e.g., today, yesterday, last week, this week, and any other periods such as this month and last month) with different average values of the operation time for a worker, allowing comparison of operations performed by the same worker over the different periods. Thus, a change in the efficiency of the operations, for example, is viewed more easily. In the present modification, as in the example of the display screen 1200, the Gantt charts that are statistical information for operations performed by a worker are compared with target values. The process with a shorter operation time than the target value by a predetermined threshold or greater is indicated as good (an icon 1202, G, in the figure indicating good), and the process with a longer operation time than the target time by a predetermined threshold or greater is indicated as poor (an icon 1201, NG, in the figure indicating not good). Evaluation information indicating the evaluation results of the statistical information may be information resulting from various evaluations. The evaluations may use predetermined criteria determined as appropriate depending on the evaluation. In response to the user operating the input device and selecting the process indicated as good or poor (the process with the icon 1201, NG, is selected in the example in the figure) on the display screen 1200, a moving image screen 1203 to show a frame-by-frame moving image of the selected process appears, and the moving image is played. The moving image to be displayed on the moving image screen 1203 may be generated by the controller 220 for each operation performed by a worker based on the moving image data stored in the storage 230, and may be stored in the storage 230.

The embodiments and modifications described above may be combined as appropriate. In the third modification, a face image of a worker is changed based on a user input. However, the PC 200 may automatically change the image to, for example, an image with the face region appearing larger in size, an image with the face region facing more to the front based on estimation of the orientation of the face, or an image more reliable as the face region, based on the face images stored in the storage 230. In some embodiments, the storage 230 prestores the face images of workers (e.g., the face images used for employee cards), worker IDs, and names as worker information, and the face images of workers to be displayed on the display screens described in the above embodiments and modifications may be changed to the worker information stored in the storage 230. In this case, the data generator 223 performs matching using the face images of workers generated by the image generator 221 and the face images of workers stored in the storage 230 based on the degree of similarity in features between the images. The data generator 223 replaces, based on the matching result, the face image to be displayed on the display screen described above with a face image with a high degree of similarity among the face images of workers stored in the storage 230, and generates data for the display screen by linking the replaced face image to the Gantt chart of the worker. Through this processing, the user can more efficiently distinguish each worker and analyze statistical information.

In the fourth modification, the details of statistical information for operations associated with individual workers are displayed on the display screen 800. In addition to or instead of the information, the details of the operation time per process, the evaluation results for each process, or information indicating results based on analysis results may be displayed. The evaluation or analysis to be used may be determined as appropriate.

Appendix 1

An image processing apparatus, comprising:
  an image obtainer (210) configured to obtain a moving image including an operation area captured with an image sensor;
  an image generator (221) configured to generate an image of a face region of a worker performing an operation in the operation area based on the moving image;
  a statistical information generator (222) configured to generate statistical information for the operation performed by the worker based on the moving image;
  a data generator (223) configured to generate data including the generated image of the face of the worker linked to the generated statistical information for the operation performed by the worker; and
  an output unit (240) configured to output the generated data.

Appendix 2

An image processing method, comprising:
  (S301) obtaining a moving image including an operation area captured with an image sensor;
  (S305) generating an image of a face region of a worker performing an operation in the operation area based on the moving image;
  (S307) generating statistical information for the operation performed by the worker based on the moving image;

(S308) generating data including the generated image of the face region of the worker linked to the generated statistical information for the operation performed by the worker; and (S309) outputting the generated data.

The invention claimed is:

1. An image processing apparatus, comprising:
a memory configured to store computer-executable instructions; and
a processor configured to execute the computer-executable instructions stored in the memory to implement;
an image obtainer configured to obtain a moving image including an operation area captured with an image sensor;
an image generator configured to generate an image of a face region of a worker performing an operation in the operation area based on the obtained moving image;
a statistical information generator configured to generate statistical information for the operation performed by the worker for each of one or more operational processes included in the operation area based on the obtained moving image;
a data generator configured to generate data including the generated image of the face of the worker linked to the generated statistical information for the operation performed by the worker; and
an output unit configured to output the generated data, wherein
the data generator generates, based on the obtained moving image, a moving image associated with the generated statistical information for the operation performed by the worker for each of the one or more operational processes,
the output unit outputs the generated moving image for each of the one or more operational processes to a display, and
the generated moving image for each of the one or more operational processes is displayed on a display screen of the display.

2. The image processing apparatus according to claim 1, wherein
the data generator generates data including images of face regions of a plurality of workers generated by the image generator linked to statistical information for operations performed by the plurality of workers generated by the statistical information generator, and
the data generator generates, for data output from the output unit, new data including at least two images of the images of the face regions of the plurality of workers integrated with the statistical information linked to the at least two images.

3. The image processing apparatus according to claim 2, wherein
the at least two images are selected based on a user input.

4. The image processing apparatus according to claim 1, wherein
the data generator generates, for data output from the output unit, new data including the image of the face region of the worker replaced by another image of the face region of the worker generated by the image generator.

5. The image processing apparatus according to claim 1, wherein
the data generator generates data including an image of the face region of the worker selected based on a criterion including at least one of a size, an orientation, or a facial feature of the face region of the worker linked to the generated statistical information for the operation performed by the worker.

6. The image processing apparatus according to claim 1, wherein
the data generator generates, based on matching between images of face regions of a plurality of workers obtained in advance and the generated image of the face region of the worker, data including an image of the face region of the worker selected from the images obtained in advance linked to the generated statistical information for the operation performed by the worker.

7. The image processing apparatus according to claim 1, wherein
the statistical information generator generates outline information and detailed information about the statistical information for the operation performed by the worker based on the moving image, and
the data generator generates data including the image of the face region of the worker linked to the outline information about the generated statistical information for the operation performed by the worker and the detailed information about the generated statistical information for the operation performed by the worker.

8. The image processing apparatus according to claim 1, wherein
the data generator generates a moving image associated with the generated statistical information for the operation performed by the worker based on the obtained moving image, and
the data generator generates data including the image of the face region of the worker linked to the generated statistical information for the operation performed by the worker and the generated moving image.

9. The image processing apparatus according to claim 1, wherein
the data generator generates data including the image of the face region of the worker linked to the generated statistical information for the operation performed by the worker for each of the one or more operational processes and the generated moving image for each of the one or more operational processes.

10. The image processing apparatus according to claim 1, wherein
the statistical information generator generates evaluation information indicating an evaluation result obtained based on a predetermined criterion for the statistical information for the operation performed by the worker generated based on the moving image, and
the data generator generates data including the image of the face region of the worker linked to the generated statistical information for the operation performed by the worker and the evaluation information.

11. An image processing method, comprising:
obtaining a moving image including an operation area captured with an image sensor;
generating an image of a face region of a worker performing an operation in the operation area based on the obtained moving image;
generating statistical information for the operation performed by the worker for each of one or more operational processes included in the operation area based on the obtained moving image;
generating data including the generated image of the face region of the worker linked to the generated statistical information for the operation performed by the worker;
outputting the generated data;

generating, based on the obtained moving image, a moving image associated with the generated statistical information for the operation performed by the worker for each of the one or more operational processes; and outputting the generated moving image for each of the one or more operational processes to a display, wherein the generated moving image for each of the one or more operational processes is displayed on a display screen of the display.

12. A non-transitory computer readable medium storing a program for causing a computer to perform a process, comprising:

obtaining a moving image including an operation area captured with an image sensor;

generating an image of a face region of a worker performing an operation in the operation area based on the obtained moving image;

generating statistical information for the operation performed by the worker for each of one or more operational processes included in the operation area based on the obtained moving image;

generating data including the generated image of the face region of the worker linked to the generated statistical information for the operation performed by the worker;

outputting the generated data;

generating, based on the obtained moving image, a moving image associated with the generated statistical information for the operation performed by the worker for each of the one or more operational processes; and outputting the generated moving image for each of the one or more operational processes to a display, wherein the generated moving image for each of the one or more operational processes is displayed on a display screen of the display.

* * * * *